United States Patent [19]

Ando et al.

[11] Patent Number: 5,523,906
[45] Date of Patent: Jun. 4, 1996

[54] RECORDING AND/OR REPRODUCING APPARATUS HAVING MECHANISM FOR CAUSING ROTARY DRUM AND TAPE CASSETTE TO RELATIVELY COME CLOSE TO EACH OTHER

[75] Inventors: Masahiro Ando; Takashi Kimura, both of Kanagawa-ken, Japan

[73] Assignee: Canon Kabushiki Kaisha, Tokyo, Japan

[21] Appl. No.: 390,163

[22] Filed: Feb. 17, 1995

Related U.S. Application Data

[63] Continuation of Ser. No. 980,999, Nov. 24, 1992, abandoned.

[30] Foreign Application Priority Data

Nov. 29, 1991 [JP] Japan .................... 3-340002
Nov. 29, 1991 [JP] Japan .................... 3-340003

[51] Int. Cl.$^6$ .................... G11B 5/52; G11B 15/28
[52] U.S. Cl. .................... 360/95; 360/85; 360/130.23
[58] Field of Search .................... 360/85, 93, 95, 360/96.1–96.4, 132, 84, 130.2–130.24

[56] References Cited

U.S. PATENT DOCUMENTS

| | | | |
|---|---|---|---|
| 4,482,085 | 11/1984 | Tanaka et al. | 242/208 |
| 4,807,077 | 2/1989 | Zaitsu et al. | 360/132 |
| 5,077,624 | 12/1991 | Nakanishi | 360/95 |
| 5,140,487 | 8/1992 | Tanaka et al. | 360/85 |
| 5,172,283 | 12/1992 | Fukuyama et al. | 360/85 |
| 5,195,001 | 3/1993 | Murakami et al. | 360/85 |
| 5,214,547 | 5/1993 | Kondo | 360/85 |
| 5,216,565 | 6/1993 | Yamaguchi | 360/85 |
| 5,231,551 | 7/1993 | Zaitsu et al. | 360/85 |
| 5,251,080 | 10/1993 | Matsuoka et al. | 360/85 |
| 5,258,881 | 11/1993 | Maehara et al. | 360/85 |
| 5,315,460 | 5/1994 | Takeda et al. | 360/85 |

Primary Examiner—Stuart S. Levy
Assistant Examiner—Jefferson Evans
Attorney, Agent, or Firm—Robin, Blecker, Daley & Driscoll

[57] ABSTRACT

In a recording and/or reproducing apparatus of the kind arranged to cause a tape extending along the front side of an opening part of a tape cassette to be relatively wrapped around the circumferential surface of a rotary drum by causing the rotary drum to enter the opening part of the tape cassette from its front side, there is provided a tape-height-restricting tape guide including a roller part which has at least its circumferential surface made of an elastic material for bringing the tape into pressed contact with a capstan and a flange part which is provided with a cutout part for avoiding the capstan. The tape guide is disposed within the opening part of the tape cassette.

5 Claims, 7 Drawing Sheets

RECORDING AND/OR REPRODUCING APPARATUS HAVING MECHANISM FOR CAUSING ROTARY DRUM AND TAPE CASSETTE TO RELATIVELY COME CLOSE TO EACH OTHER

This is a continuation application under 37 CFR 1.62 of prior application Ser. No. 07/980,999, filed Nov. 24, 1992, now abandoned.

BACKGROUND OF THE INVENTION

1. Field of the Invention

This invention relates to a recording and/or reproducing apparatus such as a cassette type compact VTR, and more particularly to an apparatus arranged to wrap a magnetic tape around the circumferential surface of a rotary drum by causing the rotary drum to enter an opening part of a tape cassette from its front side.

2. Description of the Related Art

Some of the apparatuses of the kind performing recording or reproduction by wrapping a magnetic tape around a rotary drum on which magnetic heads are mounted, such as VTRs, have come to be arranged, as a result of reduction in diameter of the rotary drum, to cause a part of the rotary drum to enter an opening part of a cassette accommodating the magnetic tape from the front side of the cassette in such a way as to form a tape path around the circumferential surface of the rotary drum.

With respect to such a rotary-drum-entering type recording and/or reproducing apparatus, it is conceivable that a further reduction in diameter of the rotary drum would permit almost the whole of the rotary drum to enter the opening part of the cassette with a plurality of tape guides arranged within the opening part of the cassette, so that the tape path adapted for recording or reproduction can be formed solely within the opening part of the cassette.

Figure 1:
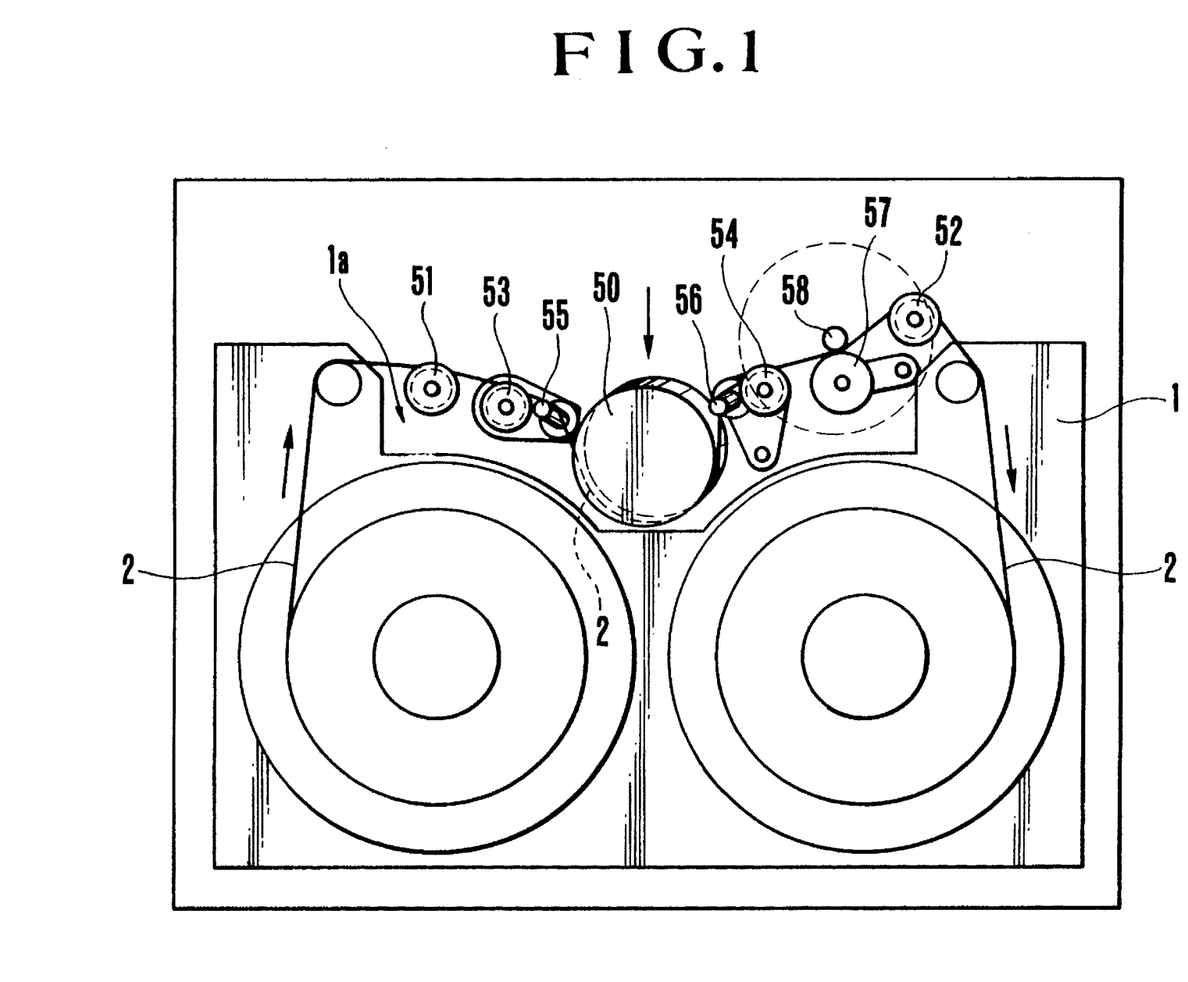
FIG. 1 is a plan view showing the basic concept of an apparatus considered by applicants in the course of developing the subject invention.
Figure 2:
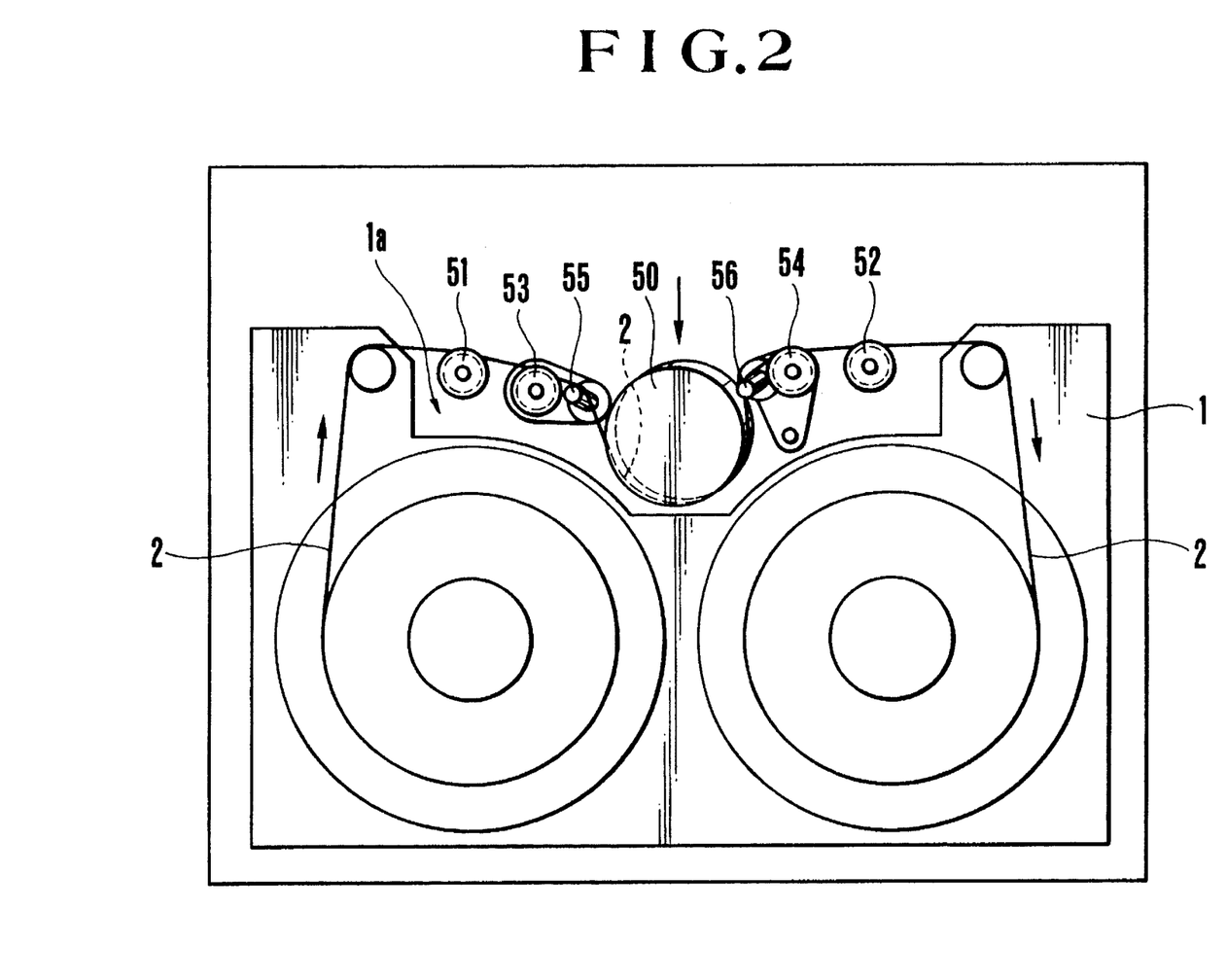
FIG. 2 is a plan view showing the basic concept of another apparatus considered by applicants in the course of developing the subject invention.

FIGS. 1 and 2 show such a concept by way of example. Referring to these figures, the tape 2 can be relatively wrapped around the circumferential surface of the rotary drum 50 by causing the rotary drum 50 to enter the opening part 1a of the cassette 1 from the front side of the cassette 1. Vertical roller guides 51 and 52 are arranged to restrict the height of the tape 2 relative to the cassette 1. Vertical roller guides 53 and 54 are arranged to restrict the height of the tape 2 relative to the rotary drum 50. Oblique guides 55 and 56 are arranged to define the angle of twist of the tape 2 for obliquely wrapping the tape 2 around the rotary drum 50. A pinch roller 57 and a capstan 58 are arranged to transport the tape 2.

In the above-stated apparatus, the tape guides 51 to 56 for restricting the height and defining the twist angle of the tape 2, the pinch roller 57 and the capstan 58 for transporting the tape 2 are indispensable parts. However, a space available inside the opening part 1a of the cassette 1 is very small. If almost the whole of the rotary drum 50 is allowed to enter the opening part 1a, it leaves little room for placing the tape guides 51 to 56, the pinch roller 57 or the capstan 58. The tape path cannot be contained completely within the opening part 1a, thus leaving a part of the tape path outside the opening part 1a.

More specifically, as shown in FIG. 1, if the pinch roller 57 is placed within the opening part 1a, the vertical roller guide 52 for restricting the height of the tape 2 relative to the cassette 1 must be located outside the opening part 1a. Further, as shown in FIG. 2, if the vertical roller guide 52 for restricting the height of the tape 2 relative to the cassette 1 is placed within the opening part 1a, it is hardly possible to secure a sufficient space for having the pinch roller 57 or the capstan 58 within the opening part 1a.

Further, it is necessary for the apparatus of this kind to accurately position the rotary drum within the opening part of the cassette to form a predetermined tape path. However, as apparent from the description given above, it is also very difficult to secure a sufficient space for arranging a rotary-drum positioning member within the opening part of the cassette.

SUMMARY OF THE INVENTION

In view of the above-stated problem, it is an object of this invention to provide a recording and/or reproducing apparatus of the kind arranged to cause a rotary drum to enter an opening part of a tape cassette, wherein a tape path formed by tape guides and tape transporting means as well as the circumferential surface of the rotary drum is arranged only within the opening part of the tape cassette and the apparatus can be of a compact size.

To attain this object, a recording and/or reproducing apparatus arranged to cause a tape extending along the front side of an opening part of a tape cassette to be relatively wrapped around the circumferential surface of a rotary drum by causing the rotary drum to enter the opening part of the tape cassette from the front side thereof is arranged as an embodiment of this invention to comprise a tape guide for restricting the height of the tape, the tape guide being arranged within the opening part of the tape cassette and having a rotatable roller portion at least a circumferential surface of which is made of an elastic material for bringing the tape into pressed contact with a capstan and a flange portion a part of which is cut out to avoid the capstan.

With the embodiment arranged as described above, the cutout part of the flange part safely escapes the capstan, and the elastic material of the roller portion reliably brings the tape into pressed contact with the capstan. Therefore, the tape guide provided for restricting the height of the tape functions also as a pinch roller. Since this tape guide is disposed within the opening part of the tape cassette, the tape can be transported with its height restricted within the opening part of the cassette.

Further, in another embodiment of the invention, a moving member on which the rotary drum is mounted is provided with an engaging part. When the rotary drum has been moved to a given position within the opening part, the engaging part of the moving member is caused to engage the above-stated tape guide in such a way as to set the rotary drum in the given position.

With the embodiment arranged in the above-stated manner, when the rotary drum is caused to enter the opening part of the tape cassette from the front side of the cassette, the engaging part of the moving member engages the tape guide disposed within the opening part to position the moving member, i.e., the rotary drum.

The moving member provided for the rotary drum and the tape guide disposed within the opening part of the tape cassette are essential members for forming a predetermined tape path within the opening part. Since the tape guide is accurately set in a given position, the rotary drum can be very accurately positioned within the opening part, without necessitating use of any other high-precision positioning member, by causing the engaging part of the moving member to engage the tape guide, with the tape guide utilized as a datum for positioning. Therefore, the invented arrangement not only permits a reduction in size of the apparatus but also enables the rotary drum to be very accurately positioned. Besides, the arrangement enables a predetermined tape path to be formed within the opening part of the tape cassette.

The above and other objects and features of the invention will become apparent from the following detailed description of embodiments thereof taken in connection with the accompanying drawings.

DETAILED DESCRIPTION OF THE PREFERRED EMBODIMENTS

Figure 3:
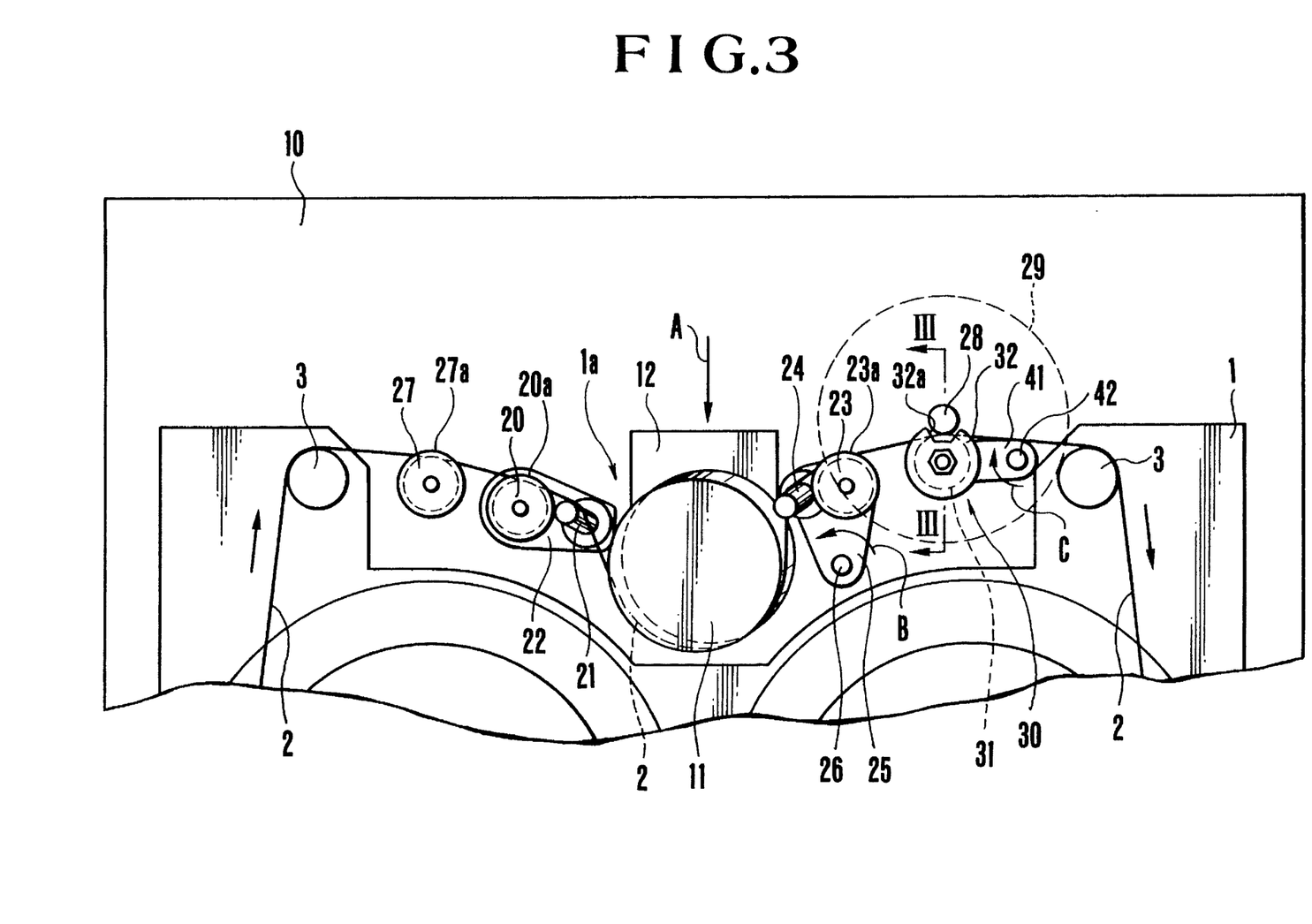
FIG. 3 is a plan view of the essential parts of a cassette type compact VTR to which this invention is applied as a first embodiment thereof, in a recording or reproducing state.
Figure 4:
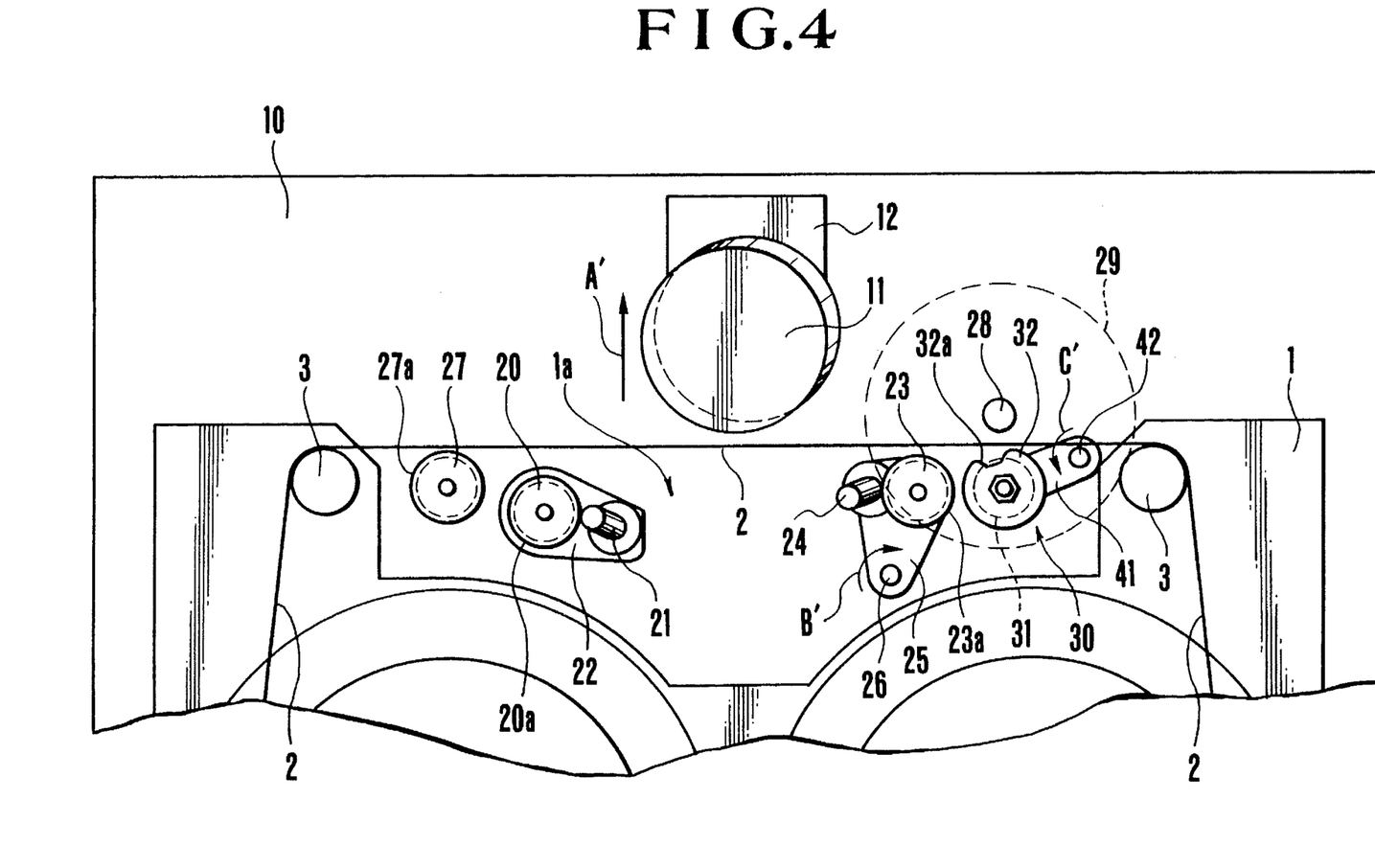
FIG. 4 is a plan view showing the essential parts of the first embodiment of the invention in a state obtained immediately after the mounting of a tape cassette.
Figure 5:
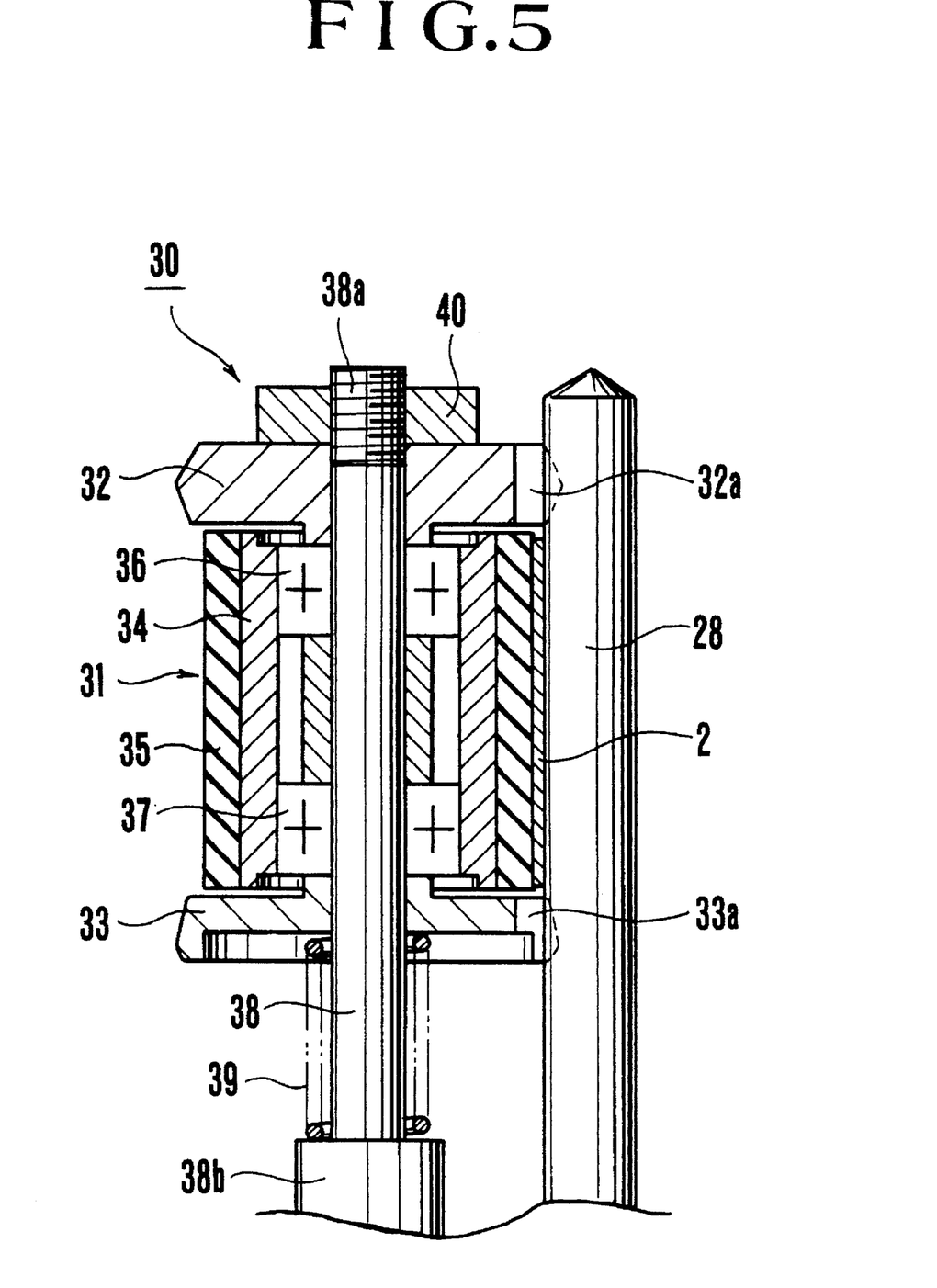
FIG. 5 is an enlarged sectional view taken along line III—III of FIG. 3, showing the arrangement of a vertical roller guide included in the first embodiment.

A cassette type compact VTR to which this invention is applied as a first embodiment thereof is described as follows with reference to FIGS. 3 to 5. FIGS. 3 and 4 are plan views showing the VTR respectively in a recording or reproducing state and in a state obtained immediately after a tape cassette is mounted on the VTR. FIG. 5 is an enlarged sectional view showing a vertical roller guide.

Referring to FIGS. 3 and 4, reference numeral 1 denotes a cassette accommodating a magnetic tape 2. The cassette 1 is provided with an opening part 1a, which is open onto each of the bottom and front sides of the cassette 1. In the state obtained immediately after the cassette 1 is mounted, as shown in FIG. 4, the tape 2 extends along the front side of the opening part 1a through a pair of tape guides 3 disposed on the left and right sides within the cassette 1. On a chassis 10 of the VTR, a magnetic head which is not shown is mounted on a rotary drum 11. The rotary drum 11 is mounted on a moving member 12 in a state of slanting at a given angle in a given direction and is arranged to be movable in the directions of arrows A and A' by means of a driving mechanism which is not shown.

On the tape-entrance side of the rotary drum 11, a vertical roller guide 20 is arranged to restrict the height of the tape 2 relative to the rotary drum 11. The vertical roller guide 20 is provided with upper and lower flange portions 20a. An oblique guide 21 is arranged to define the direction and angle of entrance into the rotary drum 11 of the tape 2. The vertical roller guide 20 and the oblique guide 21 are erected on a base 22, which is fixed to the chassis 10.

On the tape-exit side of the rotary drum 11 is provided a vertical roller guide 23 which is arranged to restrict the height of the tape 2 relative to the rotary drum 11. The vertical roller guide 23 is provided with upper and lower flange portions 23a. An oblique guide 24 is arranged to cause a part of the tape 2 which comes out of the rotary drum 11 in a slanting posture to resume a horizontal posture relative to the chassis 10. The vertical roller guide 23 and the oblique guide 24 are erected on a base 25, which is turnable around a shaft 26 in the directions of arrows B and B' on the chassis 10.

Further, a vertical roller guide 27 is arranged to restrict the height of the tape 2 relative to the cassette 1. Similar to the other vertical roller guides 20 and 23 mentioned above, the vertical roller guide 27 is provided with upper and lower flange portions 27a and is erected on the chassis 10. Another vertical roller guide 30 is also arranged to restrict the height of the tape 2 relative to the cassette 1 and is provided with upper and lower flange portions 32 and 33. The vertical roller guide 30 is erected on an arm 41. The arm 41 is pivotally carried by a shaft 42 on the chassis 10 and is arranged to be turnable in the directions of arrows C and C'. A capstan 28 protrudes from the chassis 10 and is arranged to be rotated by a capstan motor 29.

All the guides 20, 21, 23, 24, 27 and 30 are arranged in such positions that they are relatively inserted into the opening part 1a of the cassette 1 from the bottom side of the cassette 1 when the VTR is loaded with the cassette 1, as shown in FIG. 4. Further, the capstan 28 is disposed opposite to the vertical roller guide 30 with the tape 2 sandwiched between them.

Next, referring to FIG. 5, the arrangement of the above-stated vertical roller guide 30 is described in detail as follows: the vertical roller guide 30 is provided with a roller portion 31 which is arranged to come into contact with the surface of the tape 2, and upper and lower flange portions 32 and 33 which are arranged to define the positions of the upper and lower edges of the tape 2. The roller portion 31 is composed of, for example, a bush 34 which is made of metal and a rubber material layer 35 which is applied to the circumferential surface of the bush 34, for example, by baking. The roller portion 31 is fitted via bearings 36 and 37 onto a shaft 38 in such a way as to be rotatable and movable up and down.

Cutout parts 32a and 33a are provided in the upper and lower inphase parts of the upper and lower flange portions 32 and 33 on one side of the vertical roller guide 30 opposed to the capstan 28. The upper and lower flange portions 32 and 33 are fitted on the shaft 38 and are vertically movable on the shaft 38. The roller portion 31, the upper flange portion 32 and the lower flange portion 33 are urged upward by the force of a spring 39 and are restricted by a nut 40 which is screwed on a thread part 38a formed at the upper end part of the shaft 38. The height of the roller portion 31 and those of the upper and lower flange portions 32 and 33 are adjustable by rotating the nut 40.

The actions of the embodiment arranged in the above-stated manner to be performed from the cassette mounting to the recording or reproduction are described as follows:

Referring to FIG. 4, when the cassette 1 is mounted in a given position on the chassis 10, the vertical roller guides 20 and 23, the oblique guides 21 and 24 and the vertical roller guides 27 and 30 are inserted into the opening part 1a of the cassette 1 from the bottom side thereof. At the time of mounting the cassette 1, the rotary drum 11 is in a position having returned in the direction of arrow A', the base 25 in the direction of arrow B' and the arm 41 in the direction of arrow C'.

When the cassette 1 has been mounted, a cassette-in switch which is not shown is turned on. Then, as shown in FIG. 3, the moving member 12 is caused to move together with the rotary drum 11 in the direction of arrow A. The tape 2 is relatively wrapped around the circumferential surface of the rotary drum 11 accordingly as the moving member 12 moves. At the same time, the tape 2 is hung over the guides 20, 21, 23, 24, 27 and 30. The moving member 12, i.e., the rotary drum 11, comes to a stop when the rotary drum 11 reaches a predetermined point within the opening part 1a of the cassette 1. Next, the base 25 is caused to turn around the shaft 26 in the direction of arrow B and comes to a stop at a given point to complete the process of wrapping the tape 2 around the rotary drum 11.

At the same time that the base 25 turns, the arm 41 turns in the direction of arrow C around the shaft 42. The roller portion 31 of the vertical roller guide 30 comes into pressed contact with the capstan 28 with the tape 2 sandwiched between them. The cutout parts 32a and 33a formed in the upper and lower flange potions 32 and 33 of the vertical roller guide 30 are then located at the outer circumference of the capstan 28. Therefore, the upper and lower flange portions 32 and 33 are prevented from interfering with the capstan 28, so that the tape 2 can be reliably brought into pressed contact with the capstan 28 by the rubber material layer 35 of the roller portion 31.

With the VTR in this state, when a recording or reproduction button is operated, the capstan 28 begins to rotate. The tape 2 is caused to begin to travel by the capstan 28 and the roller portion 31 of the vertical roller guide 30. At the same time, the rotary drum 11 is caused to rotate to perform recording or reproduction as desired.

As described above, the cutout parts 32a and 33a of the upper and lower flange portions 32 and 33 of the vertical roller guide 30 enable the rubber material layer 35 of the roller portion 31 to reliably bring the tape 2 into pressed contact with the capstan 28 by smoothly avoiding any interference with the capstan 28. The vertical roller guide 30 for restricting the height of the tape 2 relative to the cassette 1 thus functions also as a pinch roller for transporting the tape 2. Therefore, the tape 2 can be transported while having its height restricted within the opening part 1a.

Further, in taking the cassette 1 out, actions are performed in a manner reverse to those described above. More specifically, after the arm 41 is moved back in the direction of arrow C' and the base 25 in the direction of arrow B' as shown in FIG. 4, the rotary drum 11 is moved back in the direction of arrow A' to go out from the inside of the opening part 1a of the cassette 1. The tape 2 is pulled back along the front side of the opening part 1a before the cassette 1 is ejected.

In the case of the embodiment described above, the vertical roller guide which serves to restrict the height of the tape relative to the cassette is arranged to serve also as a pinch roller. This arrangement may be changed to make another vertical roller guide which serves to restrict the height of the tape relative to the rotary drum serve also as the pinch roller.

Further, the vertical roller guide has been described as having the upper and lower flange portions in the case of this embodiment. However, it is possible to arrange the vertical roller guide to have only one of upper and lower flange portions, if the vertical roller guide is located in a position where a biasing force is expected to be applied to the tape only upward or downward.

In the case of this embodiment, as described above, a tape-height-restricting tape guide which has at least the circumferential surface of its roller portion made of an elastic material and has a cutout part formed in its flange portion is arranged within the opening part of a tape cassette. This tape guide for restricting the height of the tape can serve as a pinch roller within the opening part of the tape cassette. This arrangement obviates the necessity of separately arranging a pinch roller within the opening part. Therefore, with the VTR arranged to cause the rotary drum to enter the opening part of the tape cassette, a tape path which includes the circumferential surface of the rotary drum as well as tape guides and tape transporting means can be formed in its entirety within the opening part of the tape cassette.

A second embodiment of this invention is described below with reference to FIGS. 6 and 7:

The second embodiment is arranged to be capable of accurately positioning the rotary drum without making its structural arrangement more complex than that of the first embodiment described above. In the following description of the second embodiment, the component parts acting in the same manner as those of the first embodiment are indicated by the same reference numerals and the details of them are omitted from the following description.

Figure 6:
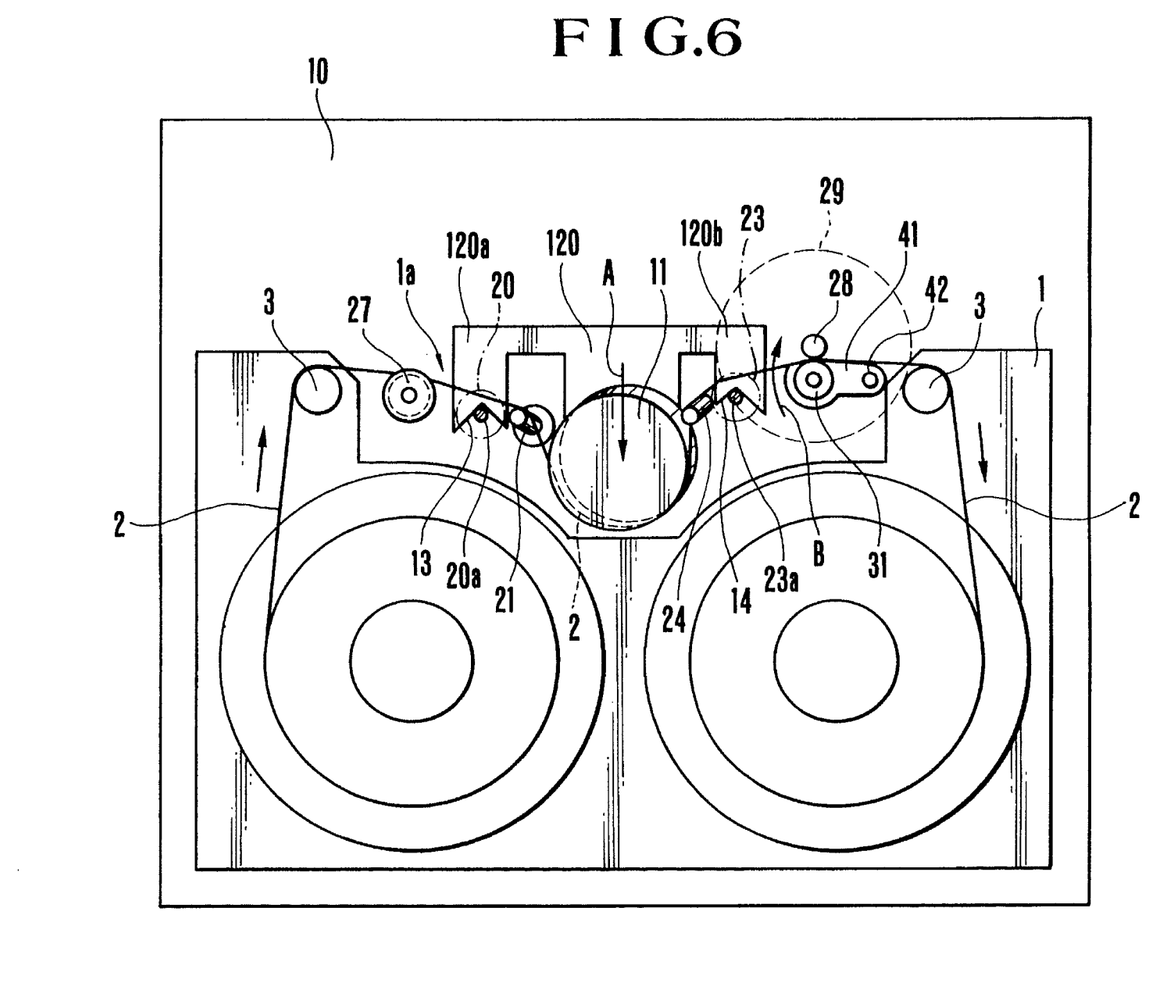
FIG. 6 is a plan view showing a second embodiment of this invention in a recording or reproducing state.
Figure 7:
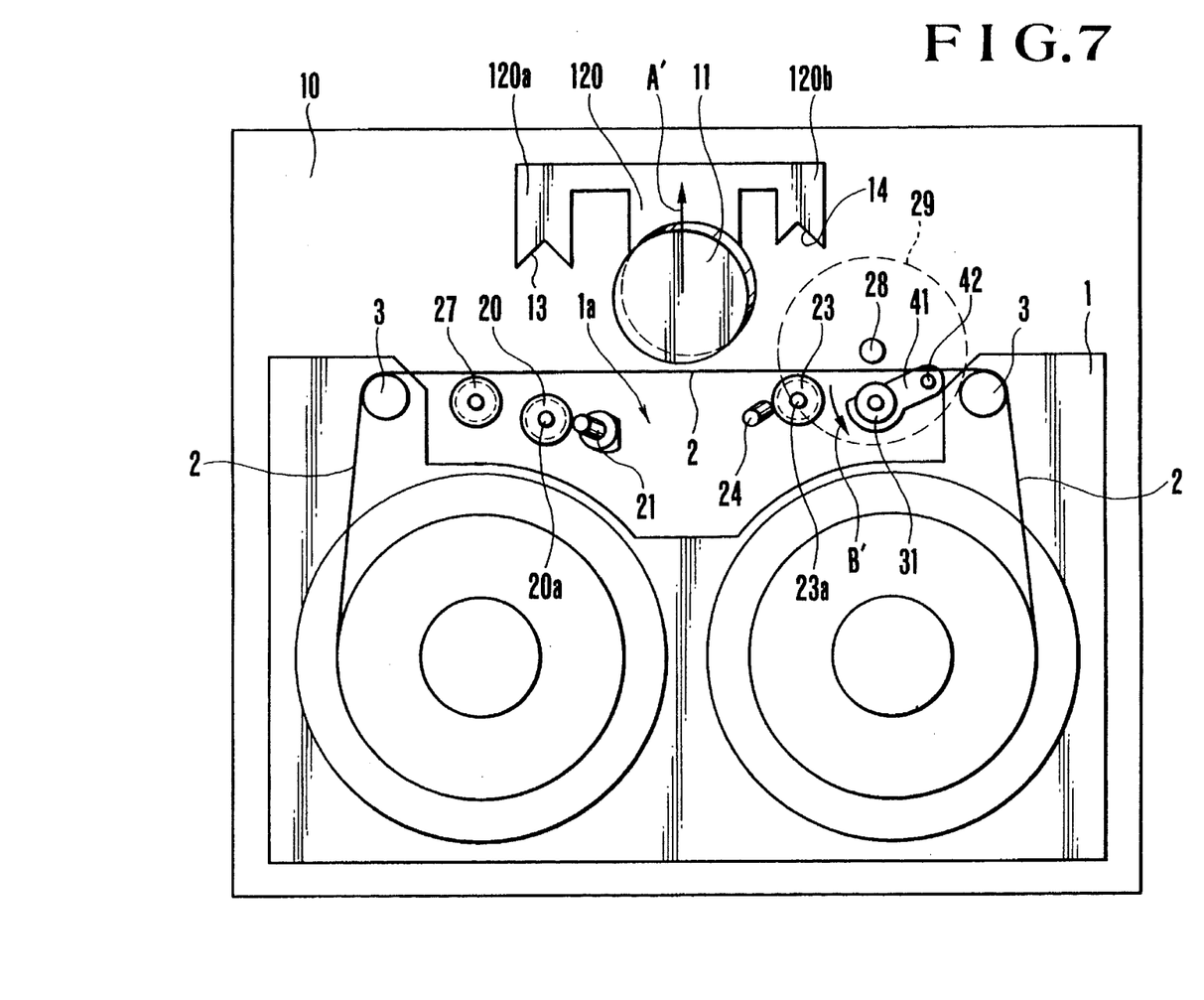
FIG. 7 is a plan view showing the second embodiment of this invention in a state obtained immediately after the mounting of a tape cassette.

Referring to FIGS. 6 and 7, a rotary drum 11 is mounted on a moving member 120 and is arranged to be movable in the directions of arrows A and A' by a driving mechanism which is not shown. The moving member 120 is integrally provided with a pair of right and left arm parts 120a and 120b. These arm parts 120a and 120b are respectively provided with engaging parts 13 and 14 which have V-shaped grooves formed respectively in their fore ends.

A vertical roller guide 20 is arranged on the entrance side of the rotary drum 11, and a vertical roller guide 23 is arranged on the exit side of the rotary drum 11. These vertical roller guides 20 and 23 are rotatably carried by shafts 20a and 23a. These shafts 20a and 23a are arranged to serve as positioning parts for the moving member 120. Although these roller guides 20 and 23 and their shafts 20a and 23a are not described in detail, each of them may be arranged similarly to the arrangement of the roller guide 30 shown in FIG. 5. The adoption of the arrangement of the roller guide 30 permits use of a lower part 38b of the shaft 38 as a positioning part.

With the second embodiment arranged in the manner as described above, its actions to be performed from the cassette mounting to the recording or reproduction are as described below:

Referring to FIG. 7, when the cassette 1 is mounted on the VTR in a given position on the chassis 10, the vertical roller guides 20 and 23, oblique guides 21 and 24, a vertical roller guide 27 and a pinch roller part 31 are inserted into the opening part 1a of the cassette 1 from the bottom side thereof. At the time of mounting the cassette 1, the rotary drum 11 is in a position having returned in the direction of arrow A' and the arm 41 in the direction of arrow B'.

When the cassette 1 has been mounted, a cassette-in switch which is not shown is turned on. The moving member 120, i.e., the rotary drum 11, is then caused to move in the direction of arrow A as shown in FIG. 6. The tape 2 is relatively wrapped around the circumferential surface of the rotary drum 11 accordingly as the rotary drum 11 moves. At the same time, the tape 2 is hung over the guides 20, 21, 23, 24 and 27. The engaging parts 13 and 14 of the moving member 120 then engage the shafts 20a and 23a of the vertical roller guides 20 and 23. This brings the moving member 120, i.e., the rotary drum 11, to a stop and the rotary drum 11 is thus set in a given position within the opening part 1a of the cassette 1.

In this case, the moving member 120 for the rotary drum 11 and the vertical roller guides 20 and 23 disposed within the opening part 1a are indispensable for forming a predetermined tape path within the opening part 1a. The vertical roller guides 20 and 23 are numbers which are precisely set in their predetermined positions. Therefore, the rotary drum 11 can be very accurately positioned within the opening part 1a by causing the engaging parts 13 and 14 of the moving member 120 to engage the vertical roller guides 20 and 23 which provide a datum for positioning without having any high precision member separately arranged for the purpose of positioning.

After positioning the rotary drum 11 in the above-stated manner, the arm 41 is turned around the shaft 42 in the direction of arrow B. The pinch roller part 31 is brought into pressed contact with the capstan 28 with the tape 2 sandwiched between them and the tape path is thus completely formed.

When a recording or reproduction button is operated under this condition, the capstan 28 begins to rotate, in the same manner as in the case of the first embodiment. The tape 2 is caused to begin to travel jointly by the capstan 28 and the pinch roller part 31, and a recording or reproduction is performed as desired.

In the case of the second embodiment described, the engaging parts of the moving member having the V-shaped grooves are arranged to engage the shafts of the vertical roller guides. This engaging arrangement, however, is variously modifiable. For example, the arrangement may be changed to have a V-shaped groove formed in a mounting base for the vertical roller guide or the like and to provide the moving member with an engaging pin or the like for engagement with the groove.

Further, while a pair of engaging parts of the moving member are arranged to engage a pair of vertical roller guides in the case of the second embodiment, it is not absolutely necessary to have two engaging parts.

While the vertical roller guides for restricting the height of the tape relative to the rotary drum are arranged to be utilized as the positioning datum, some other tape guides disposed within the opening part of the cassette may be utilized for the positioning purpose in place of them.

In the case of the second embodiment, as described above, the engaging parts are provided on the moving member on which the rotary drum is mounted. When the rotary drum is moved to a given position within the opening part of the cassette, the engaging parts engage the tape guides located within the opening part to form a predetermined tape path with the rotary drum caused to enter the opening part. In this instance, the tape guides which are precisely set in position can be utilized as positioning members. Therefore, the rotary drum can be very accurately positioned in a predetermined position within the opening part of the cassette without recourse to any special positioning member. The tape path thus can be very accurately formed within the opening part.

What is claimed is:

1. A recording or reproducing apparatus arranged to cause a rotary drum having a head and a cassette accommodating a tape to come relatively close to each other and to cause the tape to be wrapped around a circumferential surface of the rotary drum, comprising:

a) a capstan arranged to cause the tape to travel at a predetermined speed;

b) a first tape guide having a roller part and a position restricting part, said roller part being rotatably supported by a shaft and arranged to be capable of bringing the tape into pressed contact with said capstan, said position restricting part being supported by said shaft and disposed with clearance close to at least one end of said roller part and at a lower position than a top end of said capstan and arranged to restrict a position of the tape along a longitudinal axis of said shaft, wherein said first tape guide is arranged to be positioned within an opening part of the cassette when the cassette is mounted on said recording or reproducing apparatus, and wherein said position restricting part is formed in such a manner that it is proximate to and spaced from an outer circumferential surface of said capstan when the tape is brought into pressed contact with said capstan by said roller part;

c) a second tape guide arranged to restrict the height of the tape relative to said rotary drum, and a support member for supporting said second tape guide; and d) a moving part arranged to move said rotary drum toward and away from said cassette, and wherein said support member for supporting said second tape guide has a positioning part for positioning said moving part.

2. An apparatus according to claim 1, wherein at least a circumferential surface of said roller part is made of an elastic material.

3. An apparatus according to claim 1, wherein said first tape guide is arranged to restrict the height of the tape relative to the cassette.

4. An apparatus according to claim 1, wherein said first tape guide is arranged to restrict the height of the tape relative to said rotary drum.

5. An apparatus according to claim 1, wherein said position restricting part is provided with a cutout part for avoiding said capstan.

* * * * *

UNITED STATES PATENT AND TRADEMARK OFFICE
CERTIFICATE OF CORRECTION

PATENT NO. : 5,523,906
DATED : June 4, 1996
INVENTOR(S) : Masahiro Ando, et al.

It is certified that error appears in the above-indentified patent and that said Letters Patent is hereby corrected as shown below:

On the cover page, Item [54], change "RELATIVELY COME" to -- COME RELATIVELY --.

Col. 1, line 4, change "RELATIVELY COME" to -- COME RELATIVELY --.

Signed and Sealed this

Third Day of December, 1996

BRUCE LEHMAN

Attest:

Attesting Officer

Commissioner of Patents and Trademarks